(12) United States Patent
Denuit et al.

(10) Patent No.: US 7,580,923 B2
(45) Date of Patent: Aug. 25, 2009

(54) BINDING FOR MULTI-PART IDENTIFIERS

(75) Inventors: Bruno H. M. Denuit, Bellevue, WA (US); Eugene Zabokritski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 11/126,034

(22) Filed: May 10, 2005

(65) Prior Publication Data

US 2006/0259465 A1 Nov. 16, 2006

(51) Int. Cl.
*G06F 7/00* (2006.01)

(52) U.S. Cl. .................................. 707/3; 707/102; 707/2

(58) Field of Classification Search ....................... None
See application file for complete search history.

(56) References Cited

U.S. PATENT DOCUMENTS

| | | | | |
|---|---|---|---|---|
| 4,989,132 | A * | 1/1991 | Mellender et al. | 717/139 |
| 6,332,143 | B1 * | 12/2001 | Chase | 707/100 |
| 6,338,056 | B1 * | 1/2002 | Dessloch et al. | 707/2 |
| 6,529,864 | B1 * | 3/2003 | Chase | 704/9 |
| 6,581,052 | B1 * | 6/2003 | Slutz | 707/2 |
| 6,633,883 | B2 * | 10/2003 | Koskas | 707/101 |
| 6,704,741 | B1 * | 3/2004 | Lively et al. | 707/102 |
| 7,013,285 | B1 * | 3/2006 | Rebane | 705/10 |
| 7,249,312 | B2 * | 7/2007 | Jasper et al. | 715/205 |
| 7,315,872 | B2 * | 1/2008 | Narang et al. | 707/204 |
| 2003/0037291 | A1 * | 2/2003 | Goldsmith et al. | 714/38 |
| 2005/0050069 | A1 * | 3/2005 | Vaschillo et al. | 707/100 |
| 2005/0138073 | A1 * | 6/2005 | Zhou et al. | 707/104.1 |
| 2005/0187913 | A1 * | 8/2005 | Nelken et al. | 707/3 |
| 2005/0210023 | A1 * | 9/2005 | Barrera et al. | 707/5 |
| 2005/0289342 | A1 * | 12/2005 | Needham et al. | 713/169 |
| 2006/0095576 | A1 * | 5/2006 | Perry et al. | 709/227 |
| 2006/0106942 | A1 * | 5/2006 | Shan et al. | 709/240 |
| 2006/0173813 | A1 * | 8/2006 | Zorola | 707/2 |
| 2007/0100967 | A1 * | 5/2007 | Smith et al. | 709/219 |
| 2007/0118553 | A1 * | 5/2007 | Zhou et al. | 707/102 |
| 2007/0288444 | A1 * | 12/2007 | Nelken et al. | 707/3 |

OTHER PUBLICATIONS

ISO/IEC JTC 1/SC 32 N 0247, "Data Management and Interchange", Apr. 14, 1999, http://jtc1sc32.org/doc/N0201-0250/32N0247.pdf, 79 pages.

* cited by examiner

*Primary Examiner*—Christian P. Chace
*Assistant Examiner*—Tarek Chbouki
(74) *Attorney, Agent, or Firm*—Woodcock Washburn LLP

(57) ABSTRACT

Methods and computer-readable media for binding a query containing one or more multi-part identifiers in a database. An attempt is made to bind a multi-part identifier that has at least one part to any data in a database that corresponds to the at least one part. A score that is proportional to the number of parts that bind successfully in each multi-part identifier binding attempt is generated for each unsuccessful binding attempt. A result is outputted if one successful multi-part identifier binding occurred. A first error message corresponding to the multi-part identifier binding attempt having a highest score is outputted if no successful bindings occurred. A second error message is outputted if more than one successful multi-part identifier binding occurred.

19 Claims, 6 Drawing Sheets

BINDING FOR MULTI-PART IDENTIFIERS

FIELD OF THE INVENTION

This invention relates in general to the field of database management. More particularly, the invention relates to binding multi-part identifier queries in a database.

BACKGROUND OF THE INVENTION

Databases, such as relational databases, are commonly used for managing large amounts of data, and a database user, such as a developer or end-user, can access, modify or add data within the database by way of a query. For example, in the Structured Query Language ("SQL"), a query may have what is referred to as multi-part identifiers in the conventional "dot notation," such as "A.B.C.D." As the name implies, such identifiers has are composed of multiple parts (e.g., A, B, C and D) separated by "dots," or periods. Such a multi-part identifier is typically read from right to left, where the rightmost part is a column name, preceded by a table name, schema name and database name. Thus, in the above example, D would be the column name, C the table name, B the schema name and A the database name. Less than the entire path may be specified if the user is currently using the database within one of the specified levels. For example, if the user is currently operating in the table in which the desired information resides, then simply entering D as the query would result in the desired column. If the user is operating in the same database, but in a different schema, then a query of B.C.D would be required.

As databases become more advanced, a user is provided with greater flexibility, both in terms of the types of data that may be requested and the manner in which a query may be made to request the data. For example, User Defined Types ("UDTs") are user-defined, structured data types that may be implemented using the conventional dot notation discussed above. A multi-part identifier of A.B.C may be used to query a database for a "property C of property B of column A" or a "property C of column B of table A." These are in addition to the "legacy" multi-part identifier meaning discussed above.

A database that is attempting to resolve the A.B.C multi-part identifier discussed above does not know which of the above-noted interpretations the user is intending to achieve. In most cases, only one of the interpretations will achieve a result (i.e., will "bind successfully"). This is because typically there will only be one interpretation that will bind for every identifier specified in a query. Thus, one interpretation of the A.B.C multi-part identifier may look for column C of table B of schema A. If one or more of the identifiers do not correspond to a value in the database, then the database will assume that this interpretation is not correct. The database may then attempt to bind an interpretation of the A.B.C query that looks for a property C of property B of column A, or for a property C of column B of table A, and so forth. If only one of the interpretations binds successfully, the database may assume that such an interpretation is the user's desired interpretation, and may return a result.

Unfortunately, in some scenarios more than one interpretation may bind successfully. Using the above A.B.C multi-part identifier example, if the database being queried has both a column C of table B of schema A, and a property C of property B of column A, the database will not know which interpretation was desired by the user. Conventionally, this conflict was resolved by using the "most local" interpretation. In other words, the interpretation that contains the least number of column prefixes would be assumed to be the correct interpretation. In the above example, such an assumption would give the highest precedence to the interpretation of "property C of property B of column A," followed by "property C of column B of table A," and then "column C of table B of schema A." Once this assumption is made, the result is returned to the user.

Such an algorithm has a significant shortcoming. Namely, if the assumption returns an incorrect result (e.g., property C instead of the intended column C), the user may not know that the returned result is incorrect. This shortcoming is particularly acute when the returned result is in the same format as the intended result. For example, if the returned and intended results are both numerical values, there may be no way for a user to realize that the returned result is incorrect by merely looking at the result. The incorrect result might then go on to corrupt other data if it is used in calculations or the like. Tracking down the source of such an incorrect result may prove to be extremely difficult for a user because there will be no outward sign that the multi-part identifier resulted in two possible interpretations.

In other scenarios, none of the possible interpretations bind successfully. Conventionally, in such a case a generic error message such as "could not find A.B.C" would be issued. Such a message is typically not very helpful to a user because it does not describe the interpretation(s) that were attempted, and what the exact problem with each interpretation was.

Accordingly, it is desirable to have a mechanism for discerning user intent when interpreting a multi-part identifier such as a UDT. In addition, it is desirable to have a mechanism that provides useful error messages to a user in the event of an interpretation conflict, failure or the like. The present invention satisfies these needs.

SUMMARY OF THE INVENTION

In view of the foregoing shortcomings and drawbacks, methods and computer-readable media are disclosed for binding a multi-part identifier in a database. In one such method, an attempt is made to bind a multi-part identifier part-by-part in a left-to- right order. A score that is proportional to the number of parts that bind successfully in each multi-part identifier binding attempt is generated for each unsuccessful multi-part identifier binding attempt. A query result is outputted if one successful multi-part identifier binding occurred. A first error message corresponding to the multi-part identifier binding attempt having a highest score is outputted if no successful multi-part identifier bindings occurred. A second error message is outputted if more than one successful multi-part identifier binding occurred.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
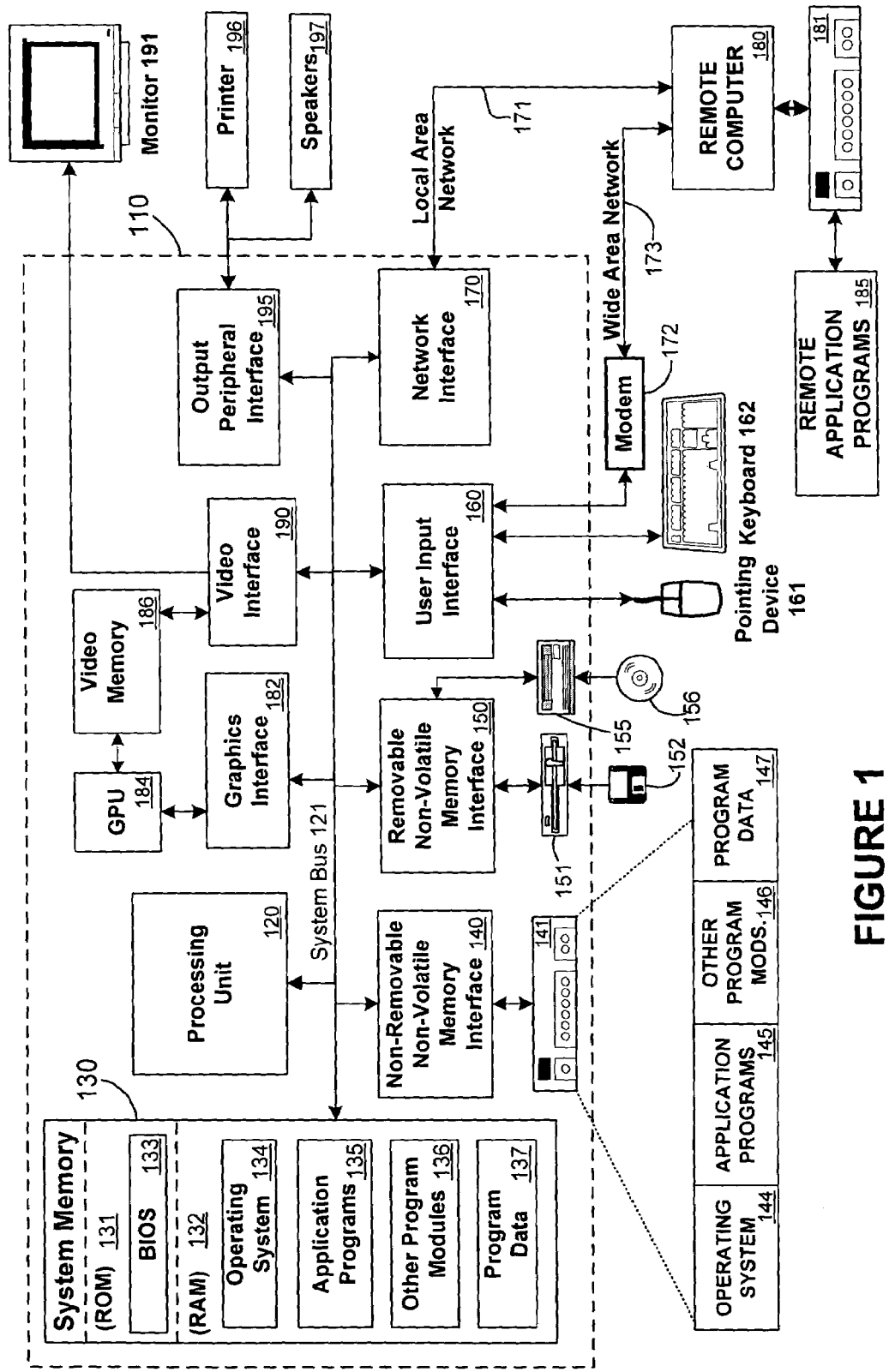
FIG. 1 is an example computing environment in which aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office.NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of NET's languages and services, and in other distributed computing frameworks as well.

Network Environment

Figure 2:
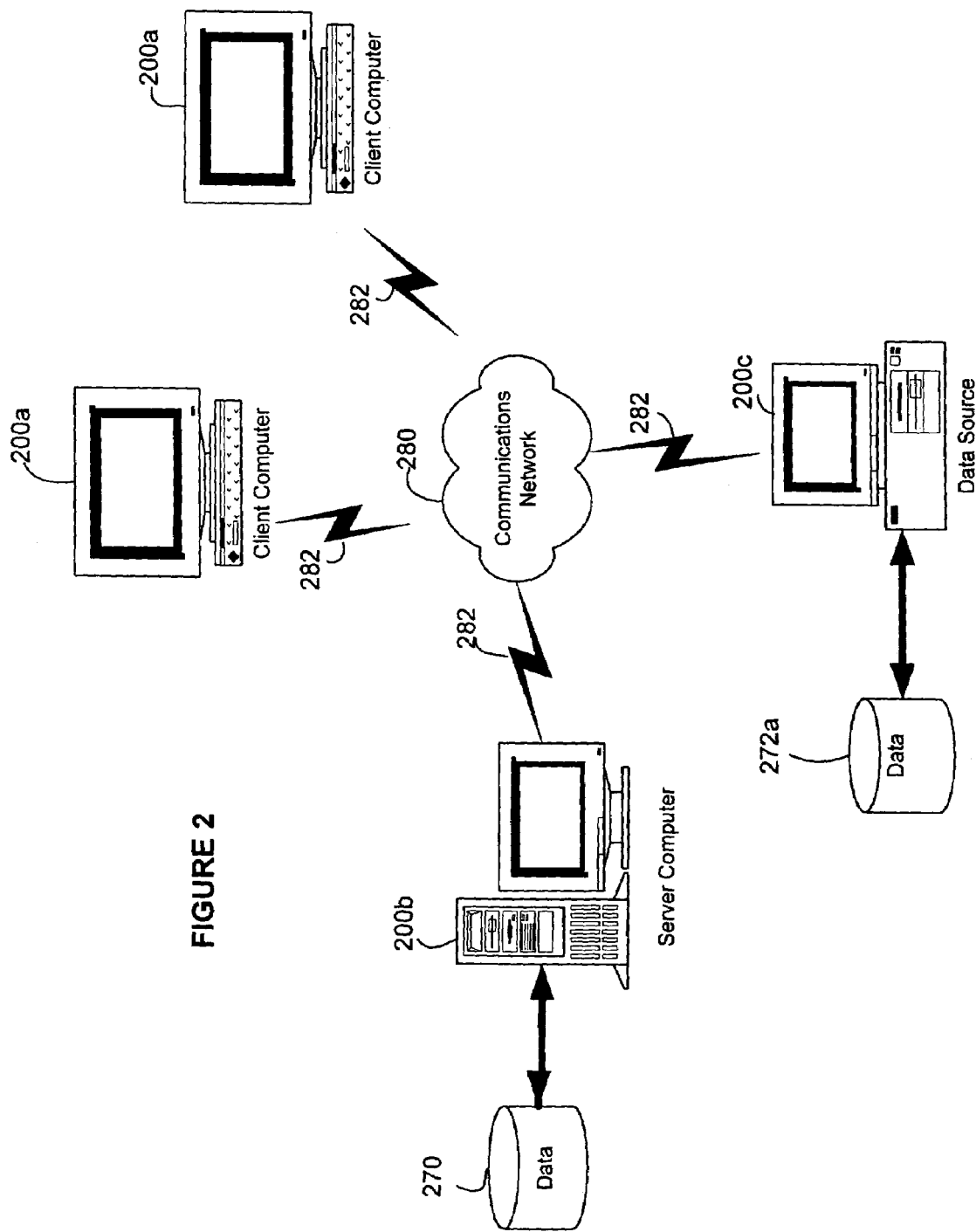
FIG. 2 is an example network configuration in which aspects of the invention may be implemented.

FIG. 2 illustrates an example network environment in which the present invention may be employed. Of course, actual network and database environments may be arranged in a variety of configurations; however, the example environment shown here provides a framework for understanding the type of environment in which an embodiment may operate.

The example network may include one or more client computers 200*a*, a server computer 200*b*, data source computers 200*c*, and/or databases 270, 272*a*, and 272*b*. The client computers 200*a* and the data source computers 200*c* may be in electronic communication with the server computer 200*b* by way of the communications network 280 (e.g., an intranet, the Internet or the like). The client computers 200*a* and data source computers 200*c* may be connected to the communications network by way of communications interfaces 282. The communications interfaces 282 can be any type of communications interfaces such as Ethernet connections, modem connections, wireless connections and so on.

The server computer 200*b* may provide management of the database 270 by way of database server system software such as MICROSOFT®'s SQL SERVER or the like. As such, server 200*b* may act as a storehouse of data from a variety of data sources and provides that data to a variety of data consumers.

In the example network environment of FIG. 2, a data source may be provided by data source computer 200*c*. Data source computer 200*c* may communicate data to server computer 200*b* via communications network 280, which may be a LAN, WAN, Intranet, Internet, or the like. Data source computer 200*c* may store data locally in database 272*a*, which may be database server or the like. The data provided by data source 200*c* can be combined and stored in a large database such as a data warehouse maintained by server 200*b*.

Client computers 200*a* that desire to use the data stored by server computer 200*b* can access the database 270 via communications network 280. Client computers 200*a* access the data by way of, for example, a query, a form, etc. It will be appreciated that any configuration of computers is equally compatible with an embodiment of the present invention.

Example Embodiments

An embodiment of the invention provides a mechanism for binding a multi-part identifier to the desired data in a manner that provides useful feedback in the event the binding cannot be carried out successfully. In addition, an embodiment provides feedback to a user when more than one interpretation successfully binds, rather than just silently providing a result that is assumed to be correct. In such a manner, therefore, an embodiment is able to provide binding services to queries that use multi-part identifiers.

In the discussion that follows herein, it is assumed that details relating to database queries that may be used in connection with, for example, SQL and the like are known to one of skill in the art. Accordingly, such details are omitted herein for clarity.

Typically, a database table may be queried in one of three ways: an identifier or property read (e.g., "select A.B.C from T"), a method or User Defined Function ("UDF") call (e.g., "select A.B( ) from T") and an identifier or property update (e.g., "update Tset A.B.C=5"). To bind such queries, one may use a utility function or the like, such as for example MICROSOFT®'s SQL SERVER's PexprBindMulti( ) utility. PexprBindMulti( ) checks a specified database to determine whether a particular interpretation of a multi-part identifier binds successfully.

If PexprBindMulti( ) is able to bind successfully, it returns a result such as an expression tree for the identifier. In event of an unsuccessful binding, PexprBindMulti( ) may return a "score." The score shows how far PexprBindMulti( ) progressed in its attempts to bind the multiple parts of the identifier in the left to right order. The score roughly corresponds to the number of parts that bound successfully. As a result, an embodiment may use the score to select an appropriate error message.

In one embodiment, multiple attempts are made to find a successful binding by attempting to bind each possible interpretation for a different number of parts in the multi-part identifier. For example, an embodiment may call a function such as PexprBindMulti( ) each time an attempt to find a successful binding for a particular number of prefixes is made. As used herein, a "prefix" refers to all parts of the multi-part identifier that precede the column name such as, for example, a table name, or a schema name followed by a table name, or a database name followed by a schema name followed by a table name. A prefix may also be referred to generically as a "part" of a multi-part identifier.

It should be noted that in the discussion that follows, provisions are made for multi-part identifiers having up to three prefixes. While the current SQL standard only permits one prefix, in order to enable backwards compatibility with older systems an embodiment is able to find successful bindings for multi-part identifiers having a plurality of prefixes. However, because a UDT does not have a backward-compatibility requirement, an embodiment may only need to support 0 or 1 prefixes for multi-part identifiers that involve such property references. Thus, when more than one prefix is present in a multi-part identifier, a determination may need to be made as to whether the multi-part identifier contains a "regular" identifier that does not involve any property references, for example. In other words, if the multi-part identifier has N parts, N-1 parts may comprise a prefix and the last part is a column name. As a result, an embodiment may have at most 3 different interpretations of a multi-part identifier with N parts: 0, 1 or N-1 prefixes. Accordingly, a 0-prefix interpretation is always possible, a 1-prefix interpretation is possible for N>1 and an N-1 prefix interpretation is possible for 2<N<5.

Figure 3:
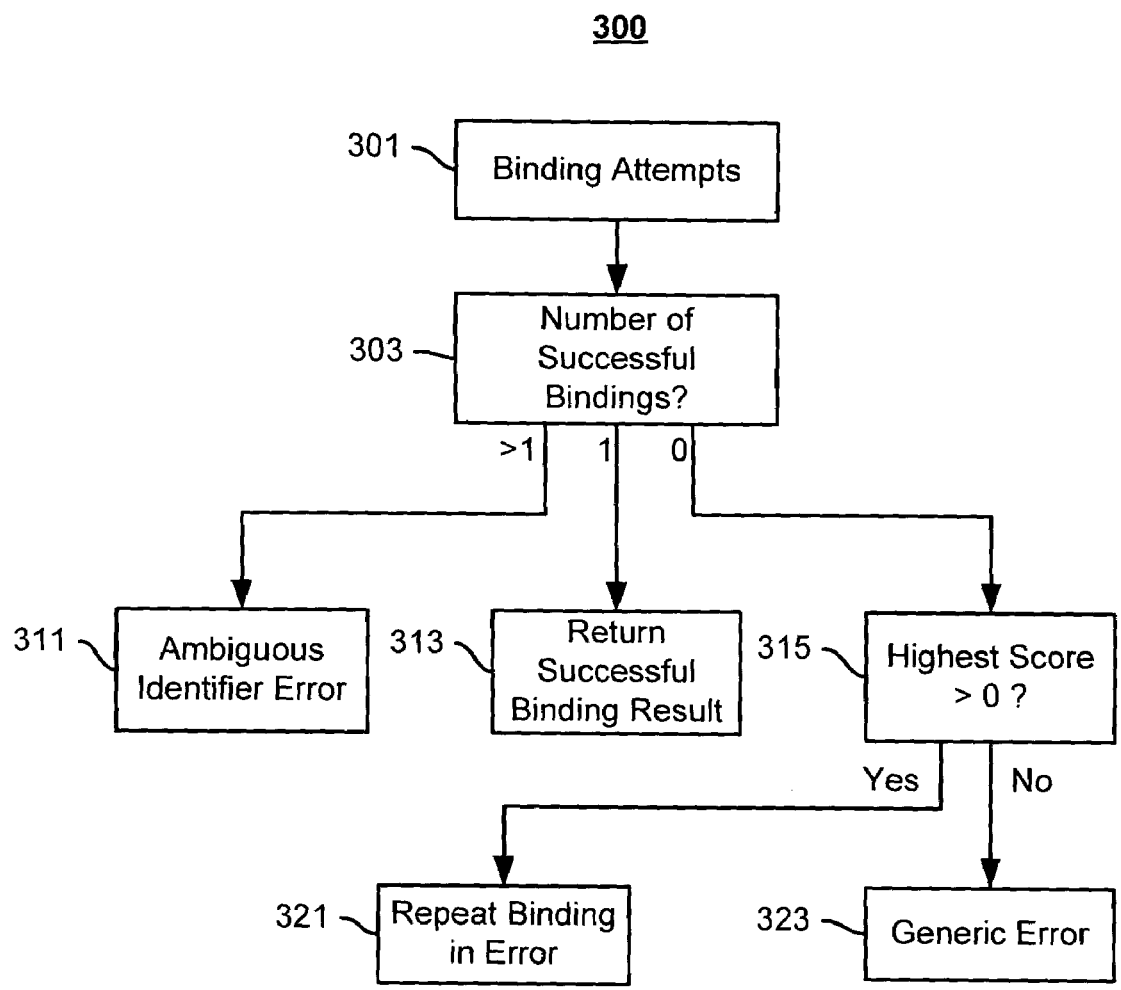
FIG. 3 is a flowchart illustrating an example binding method according to an embodiment of the present invention.

Referring now to FIG. 3, an example binding method 300 according to an embodiment is illustrated. At step 301, multiple binding attempts are made for each multi-part identifier contained in a query. Details of step 301 for three situations—a column or property read, a method or UDT function call and a column or property update—are discussed in detail below in connection with FIGS. 4-6, respectively. Generally, binding attempts are made assuming 0 multi-part identifier prefixes, then assuming 1 prefix and then, if there are more than two parts to the multi-part identifier, assuming 2 prefixes. Such binding attempts may be made by, for example, calling PexprBindMulti( ) or another component having like functionality for each binding attempt. The multiple binding attempts will therefore accumulate successful bindings and/or scores for unsuccessful bindings.

At step 303, a determination is made as to how many successful bindings resulted from the attempts made in step 301. The number of such bindings may be 0, 1 or more than 1. If one successful binding resulted, at step 313 the successful binding result is returned to the user. If the determination of step 303 is that more than one successful binding occurred, then at step 311 an ambiguous identifier error is issued to the user because of the binding conflict. In an embodiment, such an error may include information relaying the possible interpretations of the multi-part identifier so the user can determine which interpretation is the correct one. It will be appreciated that by returning an error in such a situation, rather than silently resolving the conflict and returning a result that is assumed to be correct, an embodiment provides a user with an opportunity to disambiguate the multi-part identifier interpretation by reworking the query.

If the determination of step 303 is that no successful bindings resulted in step 301, at step 315 a determination is made as to the highest score resulting from the binding attempts for each query interpretation. If that score is larger than 0, an embodiment may consider the binding that produced the score to be the "user intent." In other words, the interpretation that came closest to successfully binding may, in an embodiment, be assumed to be the user intent. Thus, the mechanism such as PexprBindMulti( ) may be called again to specify the number of prefixes that produced the maximum score and then generate error reporting for this case.

Now, with the knowledge of the user intent, the mechanism such as PexprBindMulti( ) may issue an error message that is specific for the interpretation such as, for example, "column not found" or "property not found," which may also include the name of the column or property in question. As a result, the user is informed of the particular problem with the query, and the reason for the binding failure. It will be appreciated that even in a situation where the user intent was for an interpretation that had a lower score than another interpretation an embodiment still provides useful information. For example, if the user receives an error of "column A not found" when the user intended to query property A, the user can quickly realize that the database is attempting to bind a different interpretation, and can then take steps to correct the situation.

In the rare situation where more than one interpretation achieved the same non-zero score, one of the interpretations may be picked arbitrarily. It will be appreciated that an embodiment may incorporate additional information into an error message to assist the user in diagnosing the issue.

Figure 4:
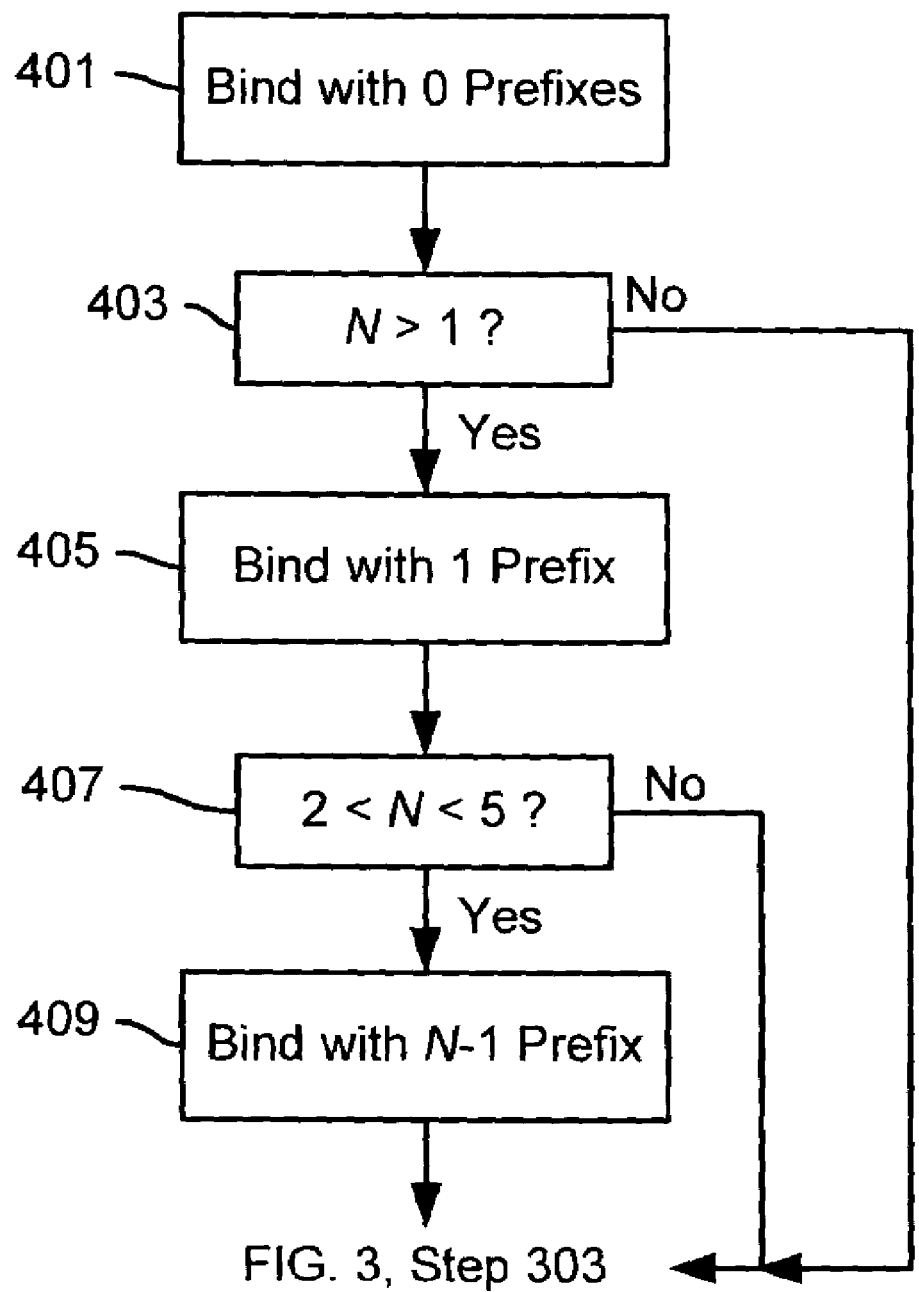
FIGS. 4-6 are flowcharts illustrating example implementations of binding methods according to embodiments of the present invention.

Thus, a method for binding multi-part identifiers is provided by an embodiment. Turning now to FIG. 4, a flowchart illustrating an example binding method in connection with a column or property read query is provided. It will be appreciated that the method illustrated in FIG. 4 is a more detailed description of step 301 of FIG. 3, above, in the context of a column or property read query. At step 401, an attempt is made—using PexprBindMulti( ) or the like—to bind the multi-part identifier using 0 prefixes. In other words, the first part of the identifier is attempted to be bound as a column name, and the remaining parts, if any, as properties of that column.

According to an embodiment, if a binding does not succeed in step 401, no error reporting need be requested because a failure does not mean that the identifier is incorrect—other interpretations are still possible and may bind successfully. The result (i.e., the score or the like) of the binding attempt, whether successful or not, may be recorded for use in, for example, method 300 of FIG. 3, as was discussed above. At step 403, a determination is made as to whether N, the number of parts in the multi-part identifier, is greater than 1. If not, the method proceeds to step 303 of FIG. 3 as was discussed above. If N is greater than one, at step 405 another binding attempt is made, this time with 1 prefix. As was the case with step 401, no error reporting need be performed because further interpretations are still possible, but any results of the binding attempt may be kept.

At step 407, a determination is made as to whether N is greater than 2 but less than 5 (in other words, whether N is 3 or 4). As was noted above, SQL convention and backwards-compatibility issues may dictate these numbers. If N is not greater than 2 but less than 5, then the method proceeds to step 303 of FIG. 3 as was discussed above. If N is greater than 2 but less than 5, at step 409 an attempt is made to bind with N-1 prefixes. During such an attempt, no error reporting need be requested, while the result may be recorded, as was the case in steps 401 and 405 above. Following step 409, the method proceeds to step 303 of FIG. 3, above. It will be appreciated that the recorded results noted above may be used in connection with steps 303-323 in method 300 of FIG. 3.

Figure 5:
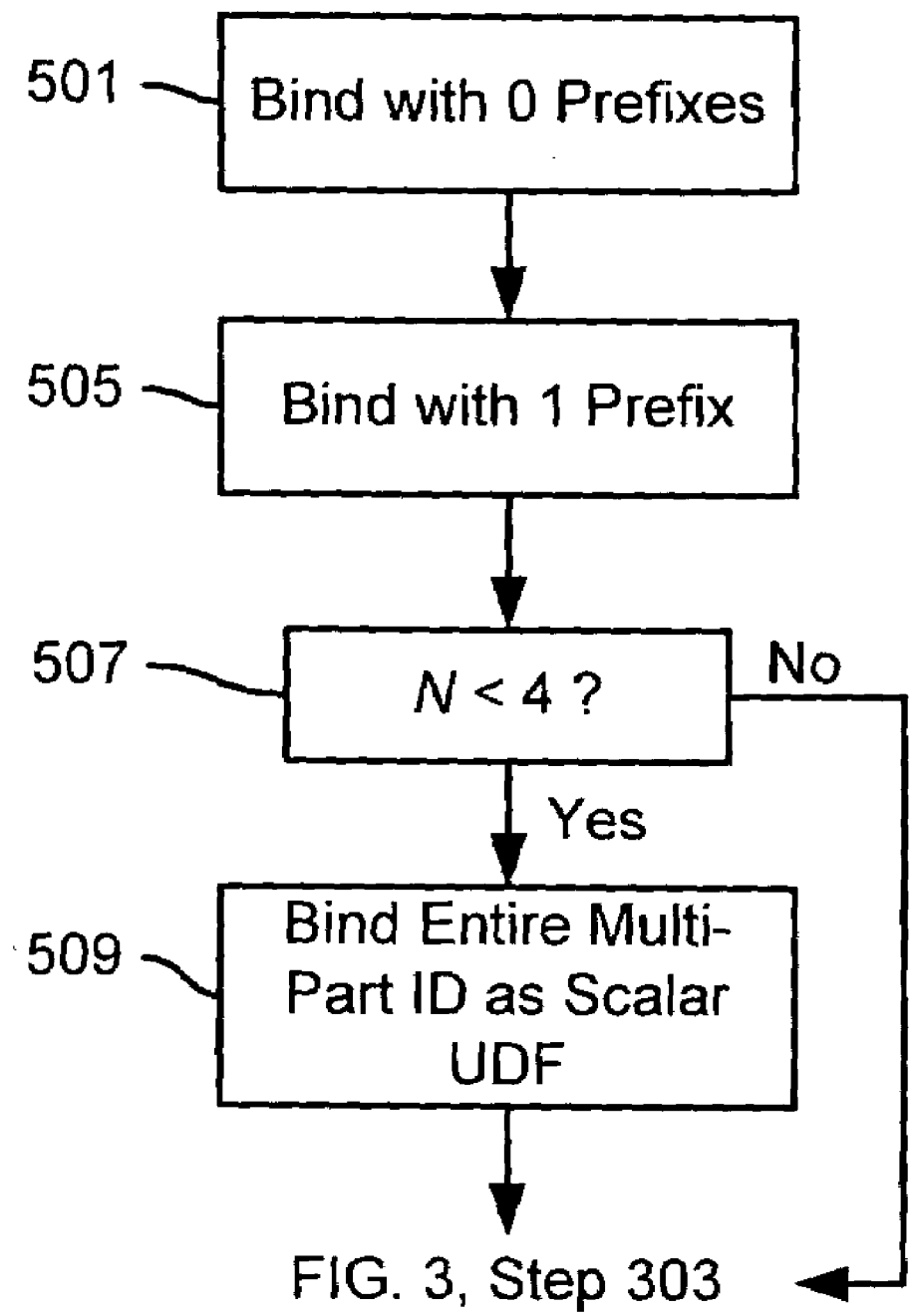

Turning now to FIG. 5, a flowchart illustrating an example binding method in connection with a method or UDF query is provided. In the method of FIG. 5, a mechanism such as PexprBindMulti( ) or the like may be used as was discussed above. As was the case with FIG. 4, above, FIG. 5 describes details relating to step 301 of FIG. 3 in connection with a method or UDF query. Thus, in the method of FIG. 5, the last part of an identifier is considered a method call rather than a property, and the binding procedure reflects the SQL requirement that identifiers having fewer than two parts are not eligible to be a method or UDF query. At step 501, a binding is attempted using 0 prefixes, as was discussed above in connection with step 401 of FIG. 4. Because method or UDF queries must, according to one embodiment, have more than two parts, at step 505 a binding is attempted using one prefix. It will be appreciated that in an embodiment steps 401 and 403 may return a result.

At step 507, a determination is made as to whether N (again, the number of parts in the identifier) is less than four. If not, the method proceeds to step 303 of FIG. 3 as was discussed above. If N is less than four, then at step 509 an attempt is made to bind the entire multi-part identifier as a scalar UDF, and then the method proceeds to step 303 of FIG. 3. It will be appreciated that the stored results of steps 501-509 may be used in connection with steps 303-323 of method 300 of FIG. 3.

Figure 6:
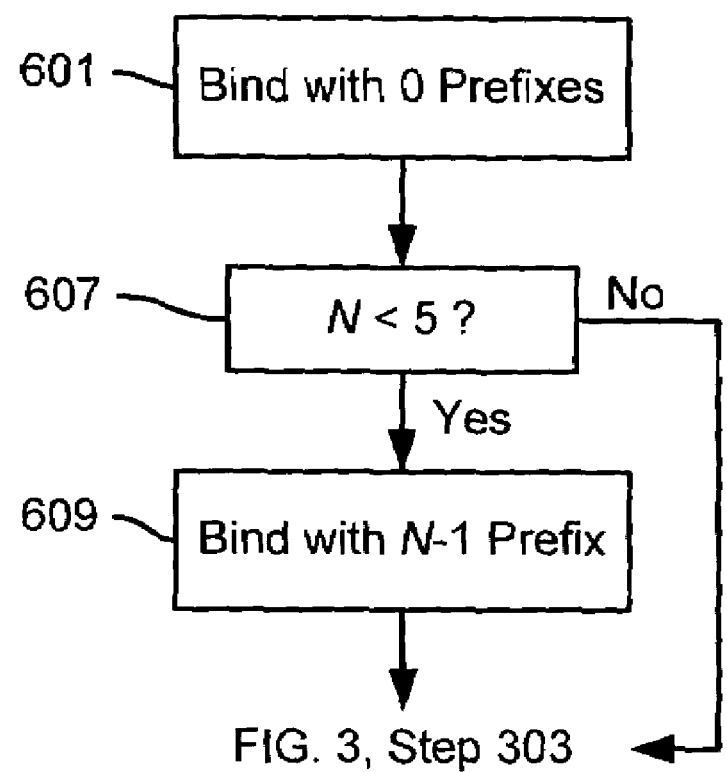

Turning now to FIG. 6, a flowchart illustrating an example binding method in connection with a column or property update query is provided. Updates typically have two "sides" for which column or property binding may logically occur. The "left-hand" side contains the column or property that is being updated, and the "right-hand" side contains the values that are used to update them. It will be appreciated that binding for the right-hand side may take place in a manner similar to that discussed above in connection with FIGS. 3 and 4.

In contrast, binding for the left-hand side may be modified from that discussed above in connection with FIGS. 3 and 4. Thus, at step 601, a binding attempt is made using 0 prefixes, as was discussed above in connection with step 401 of FIG. 4 and step 501 of FIG. 5. In an embodiment, the SQL standard dictates that the table to be updated is known and fixed when the UPDATE<Table>syntax is used. In addition, and in one embodiment, property setters do not have backwards compatibility issues, so therefore they may not need to have any prefixes.

Thus, at step 607 a determination is made as to whether N is less than five. If not, the method proceeds to step 303 of FIG. 3. If N is less than five, then at step 609 a binding is attempted using N-1 prefixes. It will be appreciated that such a binding attempt is conducted in a manner similar to those discussed above, to include the possible retention of results for possible use in later steps. Once the binding attempt of step 609 is completed, the method proceeds to step 303 of FIG. 3, as was discussed above.

It will be appreciated that while the present discussion has focused on embodiments that are compatible with the SQL standard, the invention is not so limited. For example, variations in the standard—SQL or otherwise—may result in a different number of permissible properties that may be used in connection with the queries discussed herein. Embodiments contemplate the need for additional steps to accommodate additional properties, as well as the possibility of reduced steps in the event that fewer properties are permitted. Thus, while the present invention has been described in connection with the embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A computer-implemented method for binding a query having a multi-part identifier in a database, comprising:
    attempting to bind the multi-part identifier to any data in the database that corresponds to more than one part of the multi-part identifier, wherein the multi-part identifier comprises more than one part;
    generating a score for each unsuccessful multi-part identifier binding attempt, wherein the score is proportional to a number of parts of the multi-part identifier that bind successfully in each unsuccessful multi-part identifier binding attempt, and wherein for each unsuccessful multi-part identifier binding attempt either:
    no parts successfully bind; or
    at least one part, but less than all parts, successfully bind;
    determining a highest number of parts to successfully bind, the highest number of parts to successfully bind being greater than one, wherein the highest number of parts to successfully bind being greater than one indicates an unsuccessful multi-part identifier binding attempt that has a successful binding of more than one part of the multi-part identifier; and
    outputting a first error message, wherein the first error message corresponds to the highest number of parts to successfully bind, and wherein the first error message comprises a reason for the unsuccessful multi-part identifier binding attempt associated with the highest number of parts to successfully bind, and wherein the reason is determined based upon a value of the highest number of parts to successfully bind.

2. The method of claim 1, wherein said attempting step further comprises:
- attempting to bind the multi-part identifier using one of the at least one parts as a column prefix;
- attempting to bind the multi-part identifier using two of the at least one parts if the multi-part identifier contains more than one part; and
- attempting to bind the multi-part identifier using one fewer than a total number of parts in the multi-part identifier if the multi-part identifier contains more than two and less than five parts.

3. The method of claim 2, wherein the multi-part identifier represents a column or property.

4. The method of claim 1, wherein the multi-part identifier has at least two parts and said attempting step further comprises:
- attempting to bind the multi-part identifier using a first of the at least two parts as column prefix;
- attempting to bind the multi-part identifier using the first and a second of the at least two parts as column prefix; and
- attempting to bind the multi-part identifier using all identifier parts as column prefix if the identifier contains less than four parts.

5. The method of claim 4, wherein the multi-part identifier represents a method call or a user defined function call.

6. The method of claim 1, wherein said attempting step further comprises:
- attempting to bind the multi-part identifier using one of the at least one parts as column prefix; and
- attempting to bind the multi-part identifier using one fewer than a total number of parts in the multi-part identifier if the identifier contains less than five parts.

7. The method of claim 6, wherein the query is a column update query or a property update query.

8. The method of claim 7, wherein the multi-part identifier corresponds to the column or property being updated.

9. The method of claim 8, wherein the first error message is presented in accordance with a second multi-part identifier corresponding to an update value.

10. A computer-implemented method for binding a query having a multi-part identifier in a database, comprising:
- attempting to bind the multi-part identifier to any data in the database that corresponds to more than two parts of the multi-part identifier, wherein the multi-part identifier comprises more than two parts;
- attempting to bind the multi-part identifier using one fewer than a total number of parts in the multi-part identifier;
- generating a score for each unsuccessful multi-part identifier binding attempt, wherein the score is proportional to a number of parts that bind successfully in each unsuccessful multi-part identifier binding attempt, and wherein for each unsuccessful multi-part identifier binding attempt either:
  - no parts successfully bind; or
  - at least one part, but less than all parts, successfully bind; and
- determining a highest number of parts to successfully bind, the highest number of parts to successfully bind being greater than one, wherein the highest number of parts to successfully bind being greater than one indicates an unsuccessful multi-part identifier binding attempt that has a successful binding of more than one part of the multi-part identifier; and
- outputting a first error message, wherein the first error message corresponds to the highest number of parts to successfully bind, and wherein the first error message comprises a reason for the unsuccessful multi-part identifier binding attempt associated with the highest number of parts to successfully bind, and wherein the reason is determined based upon a value of the highest number of parts to successfully bind.

11. A computer-readable storage medium having computer-executable instructions for performing a method of binding a query having a multi-part identifier in a database, the method comprising:
- attempting to bind the multi-part identifier to any data in the database that corresponds to more than one part of the multi-part identifier, wherein the multi-part identifier comprises more than one part;
- generating a score for each unsuccessful multi-part identifier binding attempt, wherein the score is proportional to a number of parts of the multi-part identifier that bind successfully in each unsuccessful multi-part identifier binding attempt, and wherein for each unsuccessful multi-part identifier binding attempt either:
  - no parts successfully bind; or
  - at least one part, but less than all parts, successfully bind;
- determining a highest number of parts to successfully bind, the highest number of parts to successfully bind being greater than one, wherein the highest number of parts to successfully bind being greater than one indicates an unsuccessful multi-part identifier binding attempt that has a successful binding of more than one part of the multi-part identifier; and
- outputting a first error message, wherein the first error message corresponds to the highest number of parts to successfully bind, and wherein the first error message comprises a reason for the unsuccessful multi-part identifier binding attempt associated with the highest number of parts to successfully bind, and wherein the reason is determined based upon a value of the highest number of parts to successfully bind.

12. The computer-readable storage medium of claim 11, wherein said attempting step farther comprises:
- attempting to bind the multi-part identifier using one of the at least one parts as a column prefix;
- attempting to bind the multi-part identifier using two of the at least one parts if the multi-part identifier contains more than one part; and
- attempting to bind the multi-part identifier using one fewer than a total number of parts in the multi-part identifier if the multi-part identifier contains more than two and less than five parts.

13. The computer-readable storage medium of claim 12, wherein the multi-part identifier represents a column or property.

14. The computer-readable storage medium of claim 11, wherein the multi-part identifier has at least two parts and said attempting step further comprises:
- attempting to bind the multi-part identifier using a first of the at least two parts as column prefix;
- attempting to bind the multi-part identifier using the first and a second of the at least two parts as column prefix; and
- attempting to bind the multi-part identifier using all identifier parts as column prefix if the identifier contains less than four parts.

15. The computer-readable storage medium of claim 11, wherein said attempting step farther comprises:
- attempting to bind the multi-part identifier using one of the at least one parts as column prefix; and attempting to bind the multi-part identifier using one fewer than a total number of parts in the multi-part identifier if the identifier contains less than five parts.

16. The computer-readable storage medium of claim 15, wherein the query is a column update query or a property update query.

17. The computer-readable storage medium of claim 16, wherein the multi-part identifier corresponds to the column or property being updated.

18. The computer-readable storage medium of claim 17, wherein the first error message is presented in accordance with a second multi-part identifier corresponding to an update value.

19. A computer-implemented method for binding a query having a multi-part identifier in a database, comprising:

attempting to bind the multi-part identifier to any data in the database that corresponds to at least one part of the multi-part identifier, wherein the multi-part identifier comprises more than one part;

generating a score for each unsuccessful multi-part identifier binding attempt, wherein the score is proportional to a number of parts of the multi-part identifier that bind successfully in each unsuccessful multi-part identifier binding attempt, and wherein for each unsuccessful multi-part identifier binding attempt either:

no parts successfully bind; or at least one part, but less than all parts, successfully bind; and determining a highest number of parts to successfully bind, the highest number of parts to successfully bind being greater than zero, wherein the highest number of parts to successfully bind being greater than zero indicates an unsuccessful multi-part identifier binding attempt that has a successful binding of at least one part, but less than all parts, of the multi-part identifier; and outputting a first error message wherein the first error message corresponds to the highest number of parts to successfully bind, and wherein the first error message comprises a reason for the unsuccessful multi-part identifier binding attempt associated with the highest number of parts to successfully bind, and wherein the reason is different than a generic message associated with binding attempts where no parts successfully bind, and wherein the reason is determined based upon a value of the highest number of parts to successfully bind.

* * * * *